Patented Oct. 10, 1922.

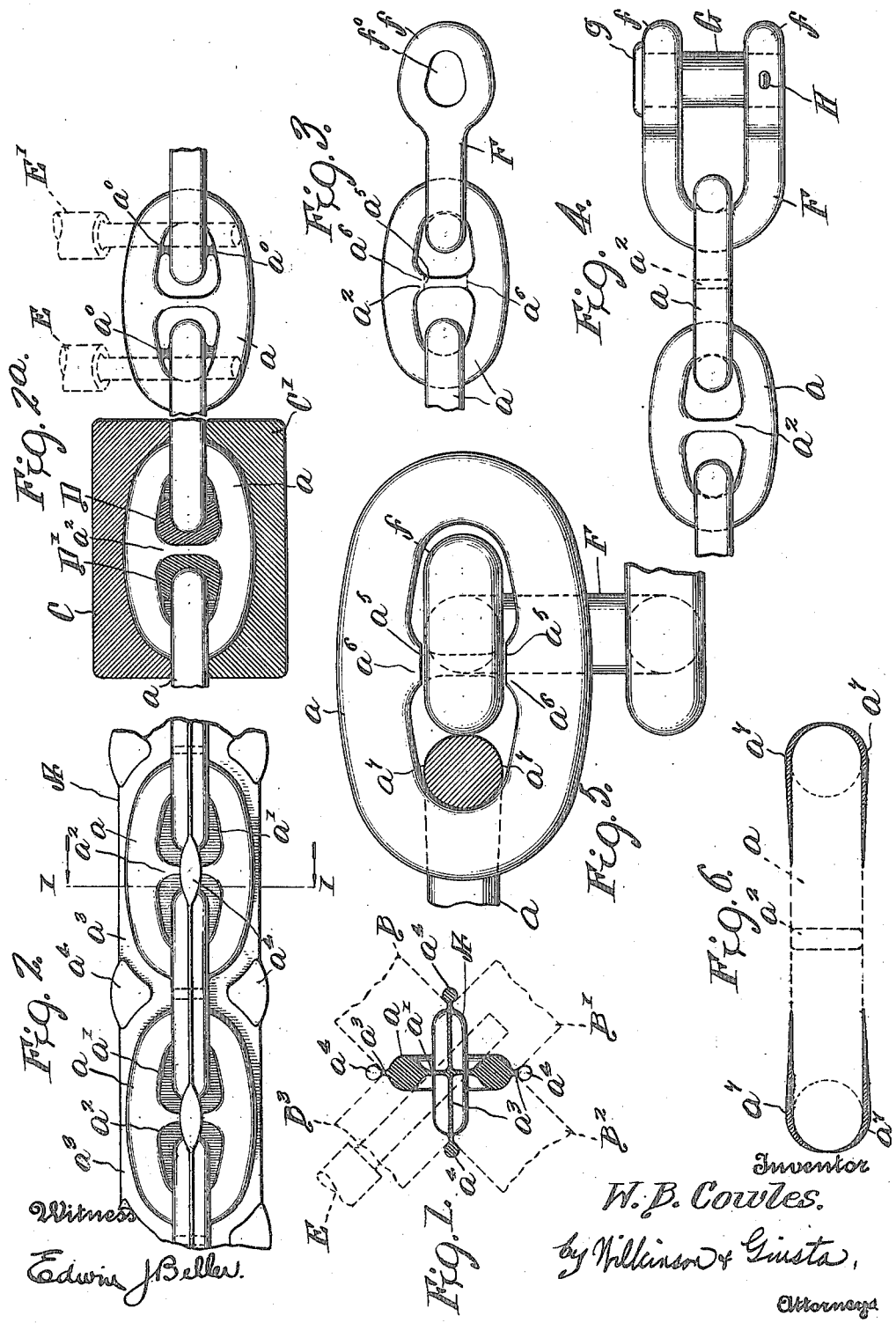

1,431,442

UNITED STATES PATENT OFFICE.

WILLIAM BARNUM COWLES, OF PHILADELPHIA, PENNSYLVANIA, ASSIGNOR TO WELDLESS CHAIN CORPORATION, OF DOVER, DELAWARE, A CORPORATION OF DELAWARE.

METHOD OF MANUFACTURING WELDLESS STUD-LINK SHIP-CABLE SHOT.

Application filed July 15, 1918. Serial No. 245,056.

*To all whom it may concern:*

Be it known that I, WILLIAM B. COWLES, a citizen of the United States, residing at Philadelphia, in the county of Philadelphia and State of Pennsylvania, have invented certain new and useful Improvements in Method of Manufacturing Weldless Stud-Link Ship-Cable Shot; and I do hereby declare the following to be a full, clear, and exact description of the invention, such as will enable others skilled in the art to which it appertains to make and use the same.

My present invention relates to improvements in the manufacture of weldless chain cable, and it relates more especially to an improved method by means of which a weldless chain cable shot may be manufactured from a single integral bar of metal.

According to my invention the billet of metal is rolled into a bar that is substantially cruciform in cross section, with the outer edges of the cross rounded. This bar is then passed between die rolls where it is formed roughly into the shape of the chain, but with extruded exterior fins and lumps of extruded metal attached thereto, and with interior webs, said webs and fins forming with the links a rigid bar. From this bar the outer fins with the lumps of metal are trimmed, and at the same time a large portion of the webs is cut away by suitable cutting or punching mechanism, which not being a part of my present invention will not be described herein. When the internal web is punched out, the stud is left in situ as an integral part of the link.

Incident to this process of trimming and punching, small portions of the web are left which will be sufficient to retain in the bar enough rigidity so that it may be handled as a bar until the connecting portions of the web are broken, when the bar becomes a chain, and each link of chain so formed is known as a chain shot.

After these small portions are broken and the bar becomes a chain, the bearings of said chain comprising the rough surface on the interior of the ends of the links, are milled or otherwise smoothed off so as to give a smooth bearing surface for the adjacent links of the chain.

At one end of each chain shot a standard shackle is attached, which may be threaded into the last link of the shot by removing the stud from the link, inserting the shackle and then re-inserting the stud in the link. This removal of the stud may be conveniently effected by torching out with an oxy-acetylene pencil flame, then the shackle is threaded in, the pin of course being removed, and then the stud may be re-inserted and welded back in place by the use of the same torch. It will be obvious that for the oxy-acetylene torch any electric process may be adopted, or the stud may be cut out mechanically and reinserted mechanically.

It will be seen that all of the links of the shot are of identical construction, being made in identical dies out of the bar of homogeneous metal, the stud of each link being rolled out integral therewith, except the stud of the last link which is also rolled out integral with said link but is subsequently removed for the insertion of the shackle and is then restored to its initial position, preferably by welding.

In the process of rolling the chain shot, the dies are so formed that the metal is thickened, or "loaded," at each end of the individual links, whereby greater strength is secured, and improved wearing quality is obtained.

My invention will be more fully understood after reference to the accompanying drawings, in which:

Figure 1 shows the bar in cross section on the line 1—1 of Fig. 2, after it has been rolled into the chain, with the fins and webs and lumps of extruded metal attached, the four die rolls being indicated in dotted lines and the punching tool for removing the portions of the web between the ends of the links being also shown in dotted lines.

Figure 2 is a side elevation of the bar after it has been rolled into the chain form and before any of the finishing processes has been started.

Figure 2ª shows a portion of the same bar as it is being fed to the trimming dies, and indicates also in dotted lines the punches for punching out the webs between the ends of the links.

Figure 3 is a side elevation of the end link of the shot, showing the shackle attached thereto, with the pin of the shackle removed.

Figure 4 is a plan view of the device shown in Fig. 3, but with an additional link of the chain shown.

Figure 5 is an enlarged view of the end link of the chain shot, showing the method of entering the eye of the shackle; and Figure 6 is a diagrammatic view showing in shaded lines the enlargement or "loading" of the two ends of the link.

Like parts are indicated by similar reference symbols throughout the several views.

A represents the bar out of which the links $a$ are formed. These links are roll forged out of the bar, the adjacent links being at right angles to each other as shown in Fig. 1, where B, B', B$^2$ and B$^3$, shown in dotted lines, indicate the four die rolls used in forming the links.

The apparatus for accomplishing the rolling of the links from the bar is illustrated, described and claimed in my co-pending application, filed July 15, 1918, Serial No. 245,057, and entitled Die rolling mill for the manufacture of weldless chain, and will not be further described herein.

The bar is rolled hot as is customary in rolling or forging steel, and when the rolling has been completed the bar so rolled is annealed in the usual way, whereby all the links are uniformly heat treated and, being made out of a homogeneous bar, there will be practically uniform strength for all the links, and this uniform strength of the individual links is maintained when the chain is completed, there being no other heat treatment required for any of the subsequent operations.

When the bar has been rolled between the die rolls into the form shown in Fig. 2, there is left in the interior of the links a web $a'$, and a stud $a^2$, while on the exterior of the links there is left oppositely disposed fins $a^3$ with extruded masses of metal $a^4$.

The bar so roll forged, as illustrated in Fig. 2$^a$, has the fins $a^3$ and extruded metal portions $a^4$ trimmed off by the trimming dies C and C', and the webs are perforated between the ends of the links and the stud by horseshoe-shaped trimming dies D and D', as shown at the left of Fig. 2$^a$.

After the trimming operation has been perfected by means of the dies C and C' and D and D', the web located between the ends of the links is perforated by the punches E and E' shown to the right of Fig. 2$^a$, and one of which also is shown in dotted lines in Fig. 1. The means for operating these punches C, C', D, D' and E, E' are illustrated, described and claimed in my co-pending application, filed July 20, 1918, Serial No. 245926, and entitled Automatic trimming press for manufacturing weldless chain, and this apparatus will not be further described herein.

After the bar so treated passes the punches E and E', the links are held together by means of the small ribs $a^0$, which constitute the remaining sections of the web not cut away by the punches, as hereinbefore described. These small ribs still maintain the bar as a rigid unit, so that it may be handled as such.

As soon as the complete bar has been run through the trimming press, the remaining ribs $a^0$ are broken, and the links then become free to move relative to each other, and what was formerly a bar now becomes a chain. This chain so formed will have its links sufficiently finished exteriorly to be ready for use, but where the web portions $a^0$ were broken away, these fractures will be irregular and it will be necessary to machine the roughened portions on the interior of the links, which may be done in any convenient way, so that there may be a smooth bearing between the adjacent links of the chain.

In order to strengthen the ends of the individual links, as hereinbefore described, the dies are so constructed that the said ends will be rolled thicker or "loaded," as shown at $a^7$ in Fig. 6.

It is important in the manufacture to have this loading placed on the sides of the link ends, and not on the inner and outer surfaces of the link ends, in order to leave as much space and clearance as possible for trimming cutters and punches on the inside of the link.

In the method herein described I have shown an integral bar converted into a single shot of weldless chain. In order to attach this shot to the adjacent shot of the weldless chain cable a connecting link or shackle of some kind is necessary, and for this purpose I prefer to use a standard shackle which is well known in this art. Such a shackle F is in the form of a U, as shown in Fig. 4, and provided with enlarged ends $f$ provided with pear-shaped holes $f^0$ to receive the shackle pin G, which is provided with the head $g$ and is held in place by the cotter pin H.

It will be obvious that this enlarged end F of the shackle will not pass through the end link of the chain unless the stud be removed; therefore, in order to connect the shackle to the end link it is necessary to remove, for the time being at least, the stud in the last link. This can be more cheaply and conveniently accomplished by means of an oxy-acetylene torch which is used to cut the stud at a point $a^5$ some distance from the body of the link, the stud being cut at the end of the shoulder $a^6$, as shown in Fig. 5. The heat of the oxy-acetylene torch, being extremely local in its application, will cut quickly through the stud, but without heating the body of the link to any such temperature as would in any way affect its previously heat treated condition.

After the stud is removed, the shackle is inserted by placing one of the enlarged ends *f* in the enlarged opening in the end link, and the shackle is then turned through a right angle to the position shown in Fig. 3, and the stud is returned to its initial position and is welded in place in any convenient way, preferably by building up with the oxy-acetylene torch, as is well known in the art.

I have thus described the conversion of a single homogeneous, cruciform bar into a shot of chain cable, and the attaching to this shot of the shackle, which shackle connects the shot of cable to the adjacent shot or to the anchor, as is well known in the art.

It will be seen that I provide a chain, all of the links of which are of practically uniform shape and strength, and therefore there is practically no weakest link in said chain. Moreover, I effect the manufacture of this chain by a series of mechanism and power work operations and there is very little hand work required. Thus, the chain may be manufactured in large quantities, and at rapid rate and low cost.

It will be obvious that various modifications might be made in the herein described construction and in the combination and arrangement of parts which could be used without departing from the spirit of my invention.

Having thus described my invention what I claim and desire to secure by Letters Patent of the United States is:—

1. The method of manufacturing single chain-cable shots from a single billet, which consists in rolling the billet into a bar of cruciform cross section and of somewhat less length than the chain shot to be formed, passing this bar while hot between quadrantally disposed die rolls thereby shaping the bar roughly into the form of links connected together by internal webs and external fins, each link having its own stud integral therewith, trimming off the fins exterior to each link, and punching out those portions of the webs between the stud of said link and the outer ends of the adjacent links, also punching out the larger part of the remaining web between the inner ends of adjacent links, leaving small ribs of the webs to maintain the desired rigidity in the bar, and finally breaking said ribs converting the bar into a chain, substantially as described.

2. The method of temporarily removing and replacing a stud from a link of chain-cable without impairing the previous heat treatment of said link, which consists in cutting the stud from the link by means of an oxy-acetylene torch at such distance from the sides of the link as not to affect the previous heat treatment thereof, and then subsequently restoring the stud to the initial position and welding the same in place, substantially as described.

In testimony whereof, I affix my signature.

WILLIAM BARNUM COWLES.